United States Patent
Iizuka

(10) Patent No.: US 12,038,103 B2
(45) Date of Patent: Jul. 16, 2024

(54) MANUALLY-OPERATED DIAPHRAGM VALVE

(71) Applicant: KITZ SCT CORPORATION, Tokyo (JP)

(72) Inventor: Hisanobu Iizuka, Ohta (JP)

(73) Assignee: KITZ SCT CORPORATION, Tokyo (JP)

( * ) Notice: Subject to any disclaimer, the term of this patent is extended or adjusted under 35 U.S.C. 154(b) by 92 days.

(21) Appl. No.: 17/793,488

(22) PCT Filed: Feb. 8, 2021

(86) PCT No.: PCT/JP2021/004499
§ 371 (c)(1),
(2) Date: Jul. 18, 2022

(87) PCT Pub. No.: WO2021/161946
PCT Pub. Date: Aug. 19, 2021

(65) Prior Publication Data
US 2023/0070374 A1    Mar. 9, 2023

(30) Foreign Application Priority Data

Feb. 10, 2020 (JP) .................................. 2020-020872

(51) Int. Cl.
*F16K 7/16* (2006.01)
*F16K 31/60* (2006.01)
*F16K 35/00* (2006.01)

(52) U.S. Cl.
CPC ................ *F16K 7/16* (2013.01); *F16K 31/60* (2013.01); *F16K 35/00* (2013.01)

(58) Field of Classification Search
CPC . F16K 7/16; F16K 31/60; F16K 35/00; F16K 1/523
(Continued)

(56) References Cited

U.S. PATENT DOCUMENTS 1,137,343 A * 4/1915 McGivern ............... F16K 27/02
251/284
3,066,908 A * 12/1962 Floren .................... F16K 5/0492
251/283
(Continued)

FOREIGN PATENT DOCUMENTS

CN    208565776    3/2019
JP    3-79875      4/1991
(Continued)

OTHER PUBLICATIONS

International Search Report issued Apr. 27, 2022 in International Application No. PCT/JP2021/004499.

*Primary Examiner* — Daphne M Barry
(74) *Attorney, Agent, or Firm* — Wenderoth, Lind & Ponack, L.L.P.

(57) ABSTRACT

A manually-operated diaphragm valve in which the open/close range of a valve disk can be set while compactness is maintained with a simple structure, and a sufficient flow rate at the time of full open is ensured. A valve main body (1) includes a valve disk (12) attached inside a body (10) and a spindle (13) screw-fastened to the body so as to be able to ascend and descend to cause the valve disk to make contact with and go away from a valve seat (14). A handle for manually performing rotating operation of the spindle is mounted above the valve main body. A full-open position adjustment mechanism (20) which limits rotation of the handle on a valve-opening operation side at full open and sets an upper limit of a flow rate when the valve disk is fully open is provided near an upper portion of the valve main body.

3 Claims, 9 Drawing Sheets

(58) Field of Classification Search
USPC .................................. 251/93, 101, 105, 251
See application file for complete search history.

(56) References Cited

U.S. PATENT DOCUMENTS

| | | | | |
|---|---|---|---|---|
| 4,545,405 | A | * | 10/1985 | LaBelle ................... F16K 17/06 137/540 |
| 4,953,586 | A | | 9/1990 | Weyer |
| 5,112,027 | A | | 5/1992 | Hanyu et al. |
| 5,427,140 | A | * | 6/1995 | Bosanquet .......... F16K 37/0058 251/285 |
| 5,551,477 | A | * | 9/1996 | Kanno ................. F16K 37/0058 137/553 |
| 6,446,539 | B1 | * | 9/2002 | Niessen ................. F15B 15/065 92/120 |
| 6,568,422 | B2 | * | 5/2003 | Niessen ................... F16K 1/523 137/385 |
| 6,691,735 | B1 | * | 2/2004 | Harneit ............... F16K 37/0008 137/524 |
| 6,783,112 | B2 | * | 8/2004 | Kerger .................... F16K 1/523 251/285 |
| 7,174,913 | B2 | * | 2/2007 | Albizuri ..................... F24C 3/12 251/297 |
| 8,726,933 | B2 | * | 5/2014 | Chen .................... F16K 17/048 137/557 |
| 2008/0061256 | A1 | * | 3/2008 | Lewis ................. F16D 43/2028 251/77 |

FOREIGN PATENT DOCUMENTS

| | | |
|---|---|---|
| JP | 5-59072 | 8/1993 |
| JP | 2000-291824 | 10/2000 |
| JP | 6580377 | 9/2019 |

* cited by examiner

MANUALLY-OPERATED DIAPHRAGM VALVE

BACKGROUND OF THE INVENTION

1. Technical Field

The present invention relates to a manually-operated diaphragm valve for use in, for example, a semiconductor manufacturing apparatus, to open and close a flow path by manual operation with a handle or the like and, in particular, to a manually-operated diaphragm valve capable of adjusting a flow rate with high accuracy at the time of full open.

2. Description of the Related Art

The manually-operated diaphragm of this type is often used as a main valve of a gas supply system for semiconductor manufacturing. By operation of a manually-operated handle provided on an upper portion of a stem (operation lever), the stem is caused to ascend and descend to cause a flow path to become in a full-open or fully-closed state. Normally, on a secondary side of the flow path where this manually-operated diaphragm valve is installed, branched flow paths are provided as being branched in parallel so that a flow with the same flow rate passes through each branched flow path. To each branched flow path, an automatically-operable automatic diaphragm valve is connected. By each automatic diaphragm valve, each flow rate to the secondary side of these valves is often adjusted.

Thus, when the manually-operated diaphragm valve is used as a main valve, for the purpose of performing flow-rate control with high accuracy at each diaphragm on the secondary side, the flow rate of the manually-operated diaphragm valve on its primary side at the time of full open is required to be accurately set.

As a manually-operated diaphragm valve to be used as a main valve, for example, the Applicant has filed a patent application of the valve of PTL 1. In this diaphragm valve, a manually-operated handle main body is mounted on an upper portion of a valve shaft. By rotating this handle main body at a rotation angle of substantially 90 degrees, a valve disk (diaphragm) is operated through the valve shaft to cause the flow path to be open or closed. In this case, it has been generally known that the open/close range of the valve disk can be set by restricting the rotation range of the handle main body. As a rotation restriction structure of the handle as described above, there may be a case in which a coupling pin is mounted on the bottom surface of the handle as being protruded and, on the other hand, a coupling pin groove is formed at an angle of substantially 90 degrees on an upper surface of the valve main body and the coupling pin is guided to the coupling pin groove, thereby setting a rotation area of the handle main body. According to this, while compactness is maintained, the opening/closing operation of the valve disk can be restricted with a simple structure by engagement between the concave and convex portions (the coupling pin and the coupling pin groove), and the flow rate at the time of full open can be set.

CITATION LIST

Patent Literatures

PTL 1: Japanese Patent No. 6580377

SUMMARY OF THE INVENTION

1. Technical Problem

However, a dimensional difference occurs in each component configuring the diaphragm valve at the time of manufacture. Thus, it is difficult to completely match the dimensions inside the valve after assembled. For example, slight distortion and variations in the shape of the diaphragm, variations in the shape and height of the valve seat when the valve seat is fixed to the body by swaging or the like, and so forth occur. These individual differences in the inner shape of the valve greatly affect the degree of opening when the valve is fully open. For example, when a rotation restriction structure by engagement between the concave and convex portions (the coupling pin and the coupling pin groove) is provided to the manually-operated diaphragm valve of PTL 1 described above and the rotation angle of the handle is restricted at 90 degrees by this rotation restriction structure, an error may occur in the rotation angle and an individual difference may occur for each valve in the flow rate at the time of full open.

As a result, there is a possibility that a difference may occur in the semiconductor manufacturing process results from the automatic diaphragm valves connected to the secondary side onward. Thus, to make the manufacturing process uniform, all automatic diaphragm valves on the secondary side may be required to be individually subjected to flow-rate adjustment.

In this manner, when the rotation angle of the handle main body is restricted so as not to be adjustable by a concave-convex-shaped engaging portion or the like between a handle side and a valve main body side, it is difficult to suppress a difference in the Cv value due to the individual difference of the valve. Also, when each automatic diaphragm valve on the secondary side is subjected to flow-rate adjustment, there is a problem in which this adjustment is very cumbersome.

Furthermore, a valve for semiconductor manufacturing is often used in a high-temperature region at 200 degree Celsius or higher. When the temperature is this high, the diaphragm and the valve seat of the manually-operated diaphragm valve are also expanded and deformed by heat. Thus, variations become further complex, the Cv value receives a further larger influence, and there is a possibility that an appropriate flow rate at the time of valve opening may not be ensured as a valve on the primary side.

From these reasons, it has been strongly desired to develop a manually-operated diaphragm valve including functions of ensuring a sufficient flow rate at the time of full open without reception of an influence by an individual difference in the inner shape of the valve and being capable of freely adjusting the flow rate at the time of full open.

The present invention was developed to solve the conventional problem, and has an object of providing a manually-operated diaphragm valve in which the open/close range of a valve disk can be set while compactness is maintained with a simple structure, a sufficient flow rate at the time of full open is ensured without reception of an influence by an individual difference in the inner shape of the valve, and the flow rate at the time of full open can also be freely adjusted.

2. Solution to the Problem

To achieve the above-described object, the present invention is directed to a manually-operated diaphragm valve, wherein a valve main body includes a valve disk formed of a diaphragm attached inside a body and a spindle screw-fastened to the body so as to be able to ascend and descend to cause the valve disk to make contact with and go away from a valve seat attached inside the body, a handle for manually performing rotating operation of the spindle is mounted above the valve main body, a bottom surface of the handle and an upper surface side of the valve main body are attached in an opposed state, a pin provided on the bottom surface of the handle is engaged with a groove portion in a substantially arc shape formed on the upper surface side of the valve main body to set a rotation area of the handle at opening and closing, the valve main boy includes a valve-closed side end face provided on one inner end of the groove portion and an advancement/retreat area linearly formed on another outer end of the groove portion, the valve main body has a communication hole which communicates with the groove portion, a female screw provided on an inner circumferential surface of this communication hole, and a set screw, which is a male screw having an abutting portion at a tip inserted from an outer end of the communication hole, this set screw is caused to advance and retreat as being finely adjusted in a linear manner in an advancement/retreat area inside the communication hole, and the set screw is fixed to an inner circumference of the communication hole with a sprew (registered trademark) having a lock function and is fixed with the sprew (registered trademark) in a state in which adjustment is made so that the pin can abut on the valve-closed side end face at a fully-closed position and the pin can abut on the abutting portion at a full-open position, thereby solve an individual difference of the valve main body.

A second aspect of the invention is directed to the manually-operated diaphragm valve, in which a rotation angle of the handle from a valve-closed state to a valve-open state is substantially 90 degrees, or any angle equal to or larger than 0 degree and equal to or smaller than 360 degrees.

3. Advantageous Effects of the Invention

From the present invention, the full-open position adjustment mechanism is provided near the upper portion of the valve main body. Thus, the full-open position of the valve disk can be set with high accuracy while compactness is maintained with a simple structure. Even if an individual difference such as a dimensional difference occurs in the inner shape of the valve after assembled, the full-open position adjustment mechanism adjusts the rotation of the handle on the valve-opening operation side to adjust the flow rate at the time of full open. Without reception of an influence by the individual difference in the inner shape of the valve, it is possible to ensure a sufficient flow rate at the time of full open. Furthermore, it is also possible to provide a diaphragm valve in which the full-open position adjustment mechanism freely adjusts the flow rate at the time of full open with high accuracy to allow characteristics of a desired Cv value to be obtained.

In this case, the male screw is rotated externally with a driver or the like and, with screwing between this male screw and the female screw, the abutting portion is caused to advance and retreat in the moving direction of the pin, thereby facilitating adjustment of the screw-in position in the advancement/retreat area inside the communication hole. By finely adjusting the abutting portion by these male screw and female screw, the rotation of the handle on the valve-opening operation side is conveniently increased or decreased and adjustment is made so that the handle can be stopped at the full-open position or in a desired range of the rotation angle of the handle. Then, the set screw can be fixed with the sprew (registered trademark) having a lock function. It is possible to provide a diaphragm restricting the opening/closing operation of the valve disk with a simple structure and capable of restricting an individual difference. With this, when the handle is at full open, the pin abuts on the abutting portion and the upper limit of that rotation position is reliably set with high accuracy, and a correct flow rate can be ensured at the time of full open.

Furthermore, the pin is provided on the bottom surface of the handle and, on the other hand, the male screw is provided so as to be able to freely advance and retreat in a state of being buried in a communication hole linearly formed to communicate with the side surface of the valve main body from an end position of the groove portion on the full-open side. The screw-in side end face of this male screw is taken as the abutting portion of the pin. Thus, an increase in the entire height is also suppressed, and an area for arranging the full-open position adjustment mechanism including the pin and male screw is not required to be allocated outside the valve main body. These can be arranged on the upper portion of the valve main body to maintain compactness and prevent an increase in the size of the valve main body. Furthermore, the male screw can be easily inserted from the side surface of the valve main body.

Even if the strength of the material configuring the handle is weak, the strength of the female screw is improved to prevent a crush or the like of this female screw, and the set screw can be reliably inserted into a desired position. A lead error and an angle error of the male screw and the female screw are absorbed to prevent a positional deviation of the set screw. Restriction of the full-open position of the handle by this set screw can be maintained.

From the second aspect of the invention, by adjusting the rotation angle of the handle from a valve-closed state to a valve-open state to substantially 90 degrees, the valve can be applied to a valve of a quarter-turn type. Even when the rotation angle of the handle is small as in this case, an accurate flow rate is ensured at the time of full open. Also, the rotation angle of the handle from a valve-closed state to a valve-open state can be provided to be any angle from 0 degree to 360 degrees. In this case, with the flow rate at the time of full open being set smaller or larger than that of the valve of the quarter-turn type, this flow rate at the time of full open can be adjusted with high accuracy and be set at a desired Cv value.

DETAILED DESCRIPTION OF EMBODIMENTS OF THE INVENTION

Figure 1:
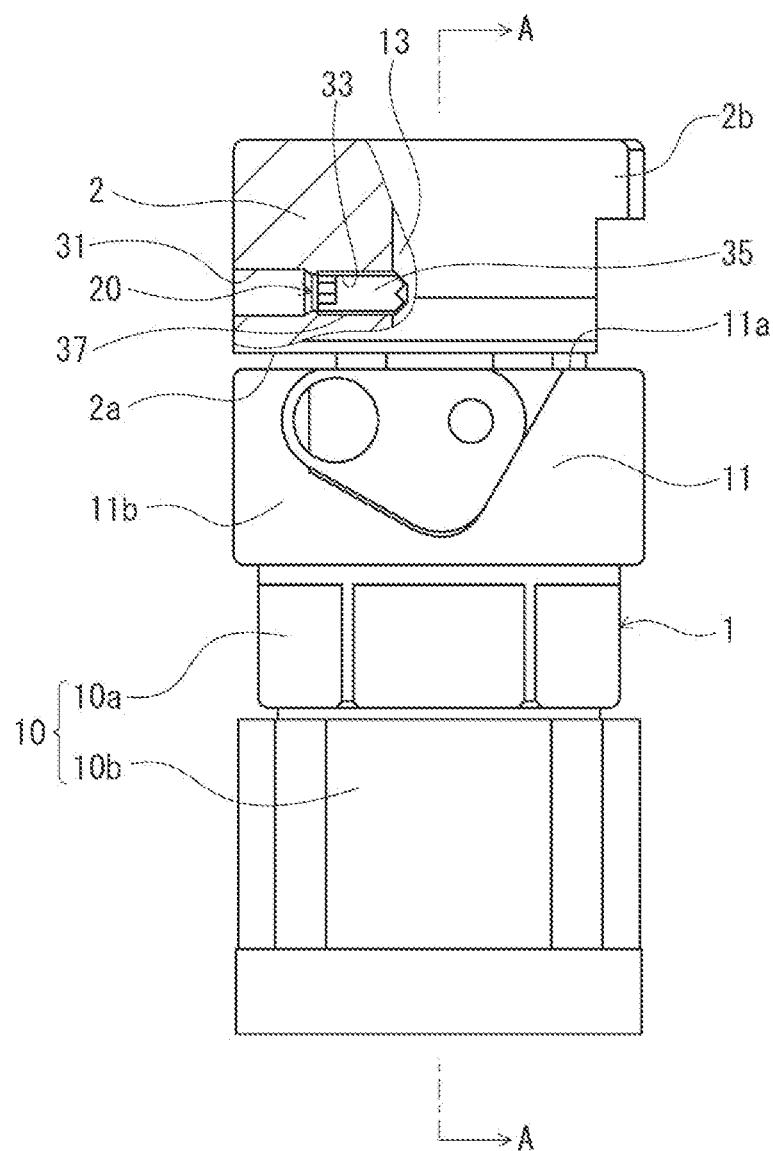
FIG. 1 is a front view depicting a first embodiment of a manually-operated diaphragm valve of the present invention.
Figure 2:
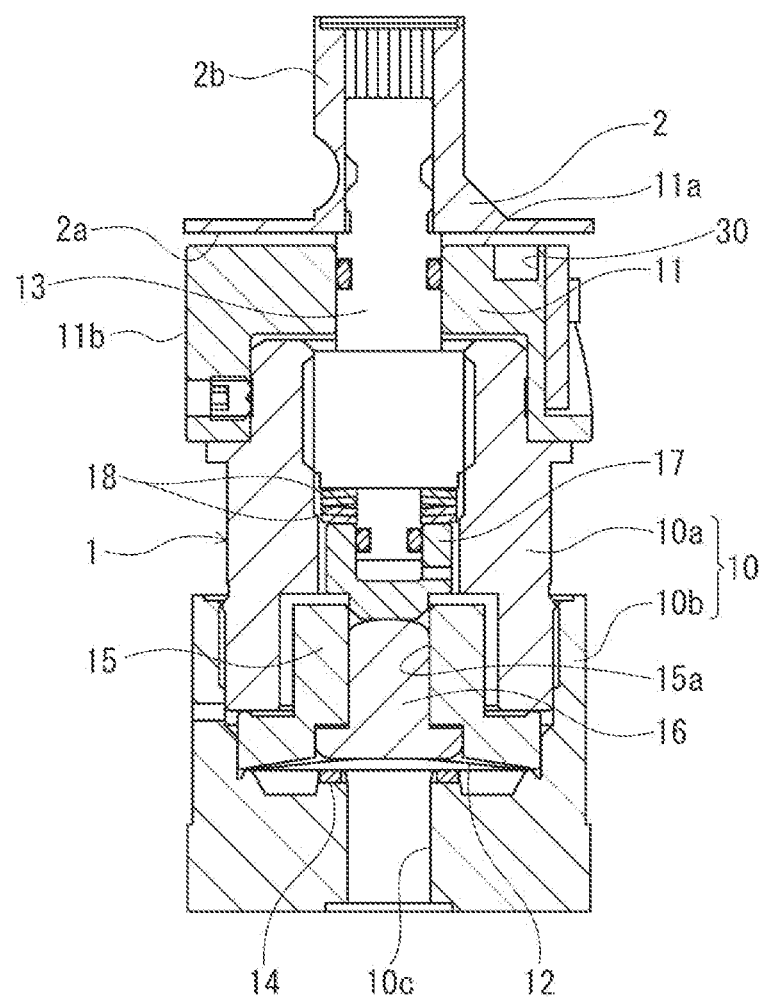
FIG. 2 is an A-A sectional view of FIG. 1.
Figure 3:
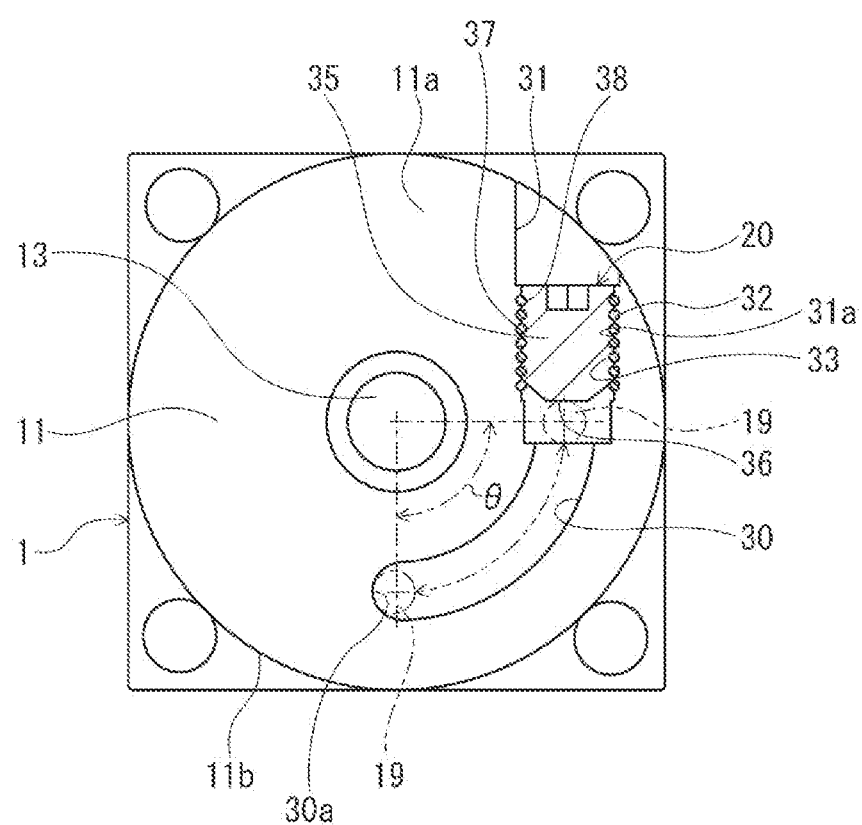
FIG. 3 is a schematic plan view of FIG. 1, with a handle removed therefrom.
Figure 4:
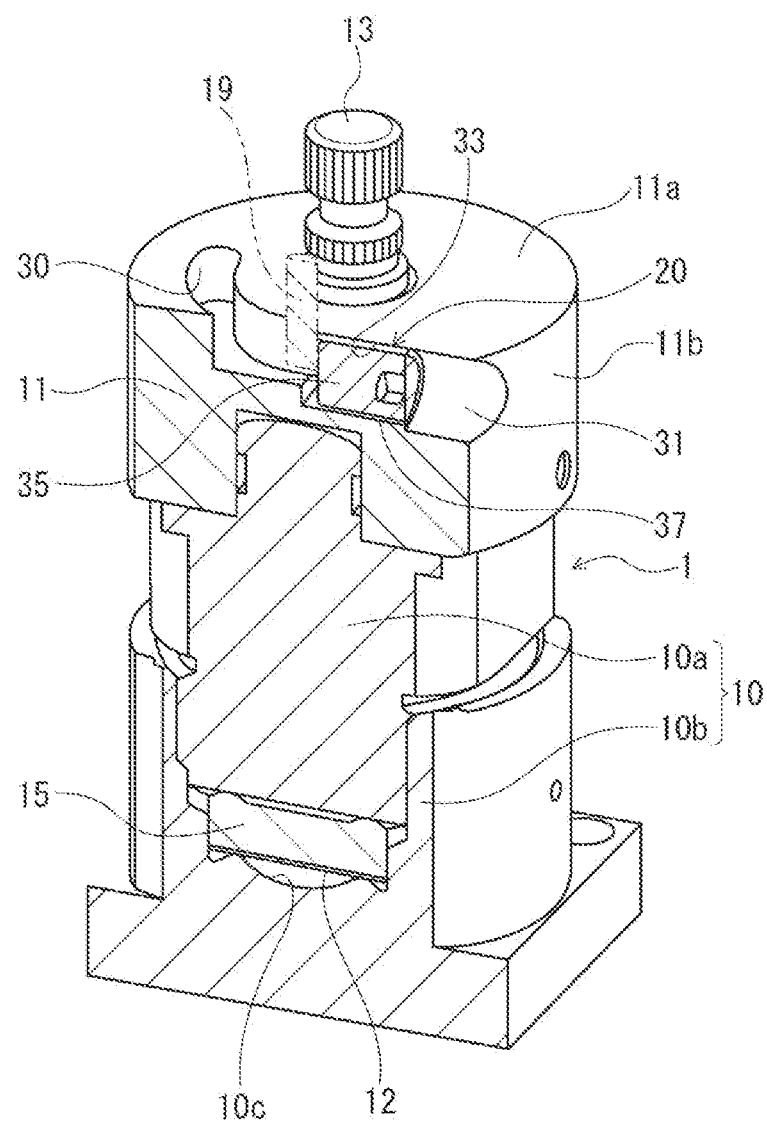
FIG. 4 is a partially-cutaway perspective view of a valve main body.

In the following, embodiments of a manually-operated diaphragm valve in the present invention are described based on the drawings. In FIG. 1 and FIG. 2, a first embodiment of the diaphragm valve of the present invention is depicted. FIG. 3 depicts a schematic plan view of FIG. 1, with a handle removed therefrom. FIG. 4 depicts a partially-cutaway perspective view of a valve main body.

In the drawings, the manually-operated diaphragm valve in the present invention includes a valve main body 1 and a handle 2. Of these, the valve main body 1 has a body 10, a cap 11, a valve disk 12, a spindle 13, a valve seat 14, a bonnet 15, a pressurizing member 16, a spindle cap 17, and a disc spring 18. Near an upper portion of the valve main body 1, a full-open position adjustment mechanism 20 is provided. The valve main body 1 is operated to be open and closed at an open/close angle of substantially 90 degrees of the handle 2.

The body 10 is formed of an upper body 10a and a lower body 10b, and these are integrated by screwing. Inside the body 10, a substantially disc-shaped valve disk 12 formed of a diaphragm is attached. On an upper portion side of this valve disk 12, the spindle 13 is screw-fastened so as to be able to ascend and descend. The valve seat 14 is attached at a position below the valve disk 12 inside the body 10. With the spindle 13 ascending and descending, the valve disk 12 makes contact with and goes away from the valve seat 14, and a flow path 10c formed inside the body 10 is thereby provided to be able to be opened and closed. To an upper portion of the body 10, the cap 11 is fixedly attached.

Figure 6:
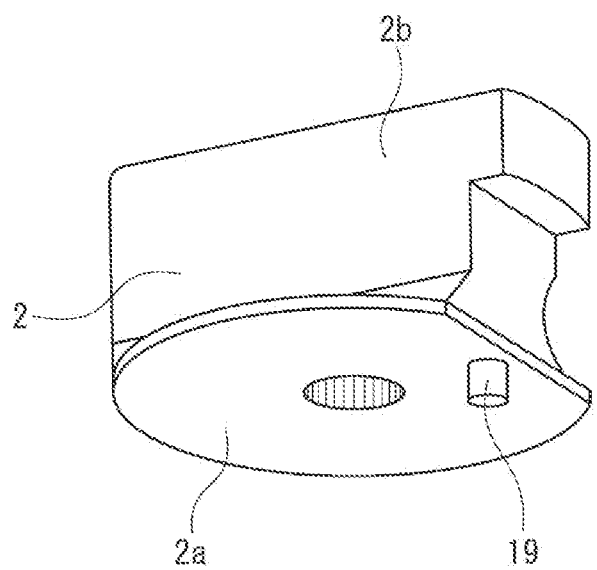
FIG. 6 is a perspective view depicting the handle.

The handle 2 depicted in FIG. 6 is integrally attached to an upper end side of the spindle 13 so as to be detachable therefrom by a serration structure, and is thereby disposed above the valve main body 1. After attachment of the handle 2, a bottom surface 2a of this handle 2 and an upper surface 11a side of the cap 11 on the upper portion of the valve main body 1 are in a state of being opposed to each other. In a state in which looseness and idling are inhibited by the serration structure, the spindle 13 is provided to be integrally rotatable with rotation of the handle 2.

On an upper portion of the handle 2, a knob portion 2b is formed. With this knob portion 2b being held and operated to rotate, the spindle 13 ascends or descends while rotating together with rotation of the handle 2, thereby allowing the valve disk 12 to be operated to be opened or closed.

On the bottom surface 2a of the handle, a pin 19 formed to have a predetermined outer diameter and length is mounted so as to protrude downward.

In FIG. 3 and FIG. 4, the cap 11 is attached near the upper portion of the body 10 and provided to an upper portion of the valve main body 1. This cap 11 is provided with the full-open position adjustment mechanism 20. The full-open position adjustment mechanism 20 is provided on a valve-opening operation side of the cap 11. By this full-open position adjustment mechanism 20 limiting rotation of the above-described handle 2 on a valve-opening operation side at the time of full open, an upper limit of the flow rate when the valve disk 12 is fully open is set.

On the upper surface 11a of the cap, a groove portion 30 in a substantially arc shape is formed at a position corresponding to the pin 19. The groove portion 30 is provided in an angle range of substantially 90 degrees, with a width and a depth allowing the pin 19 to be guided. One end side of this groove portion 30 serves as a valve-opening operation side, and the other end side thereof serves as a valve-closing operation side. When the pin 19 reaches a full-open side, this pin 19 abuts on a full-open position adjustment mechanism 20 side. On the other hand, when the pin 19 reaches a full-closed side, the pin 19 abuts on a valve-closed-side end face 30a.

Figure 5:
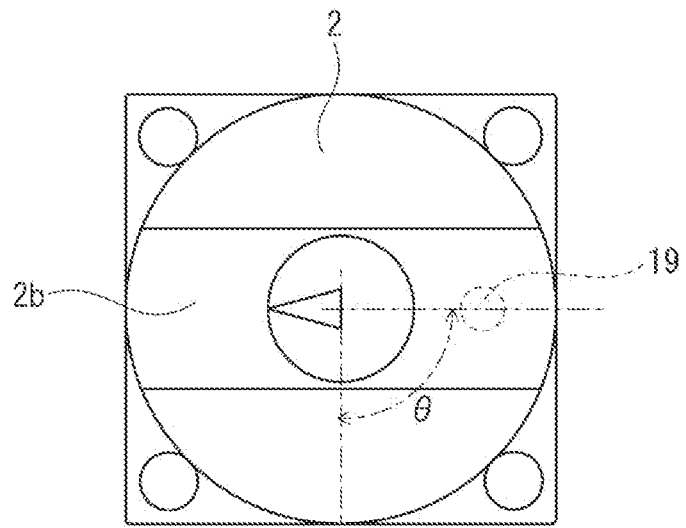
FIG. 5 is a plan view of FIG. 1, in which (a) is a plan view depicting an open state of the handle and (b) is a plan view depicting a closed state of the handle.
Figure 5:
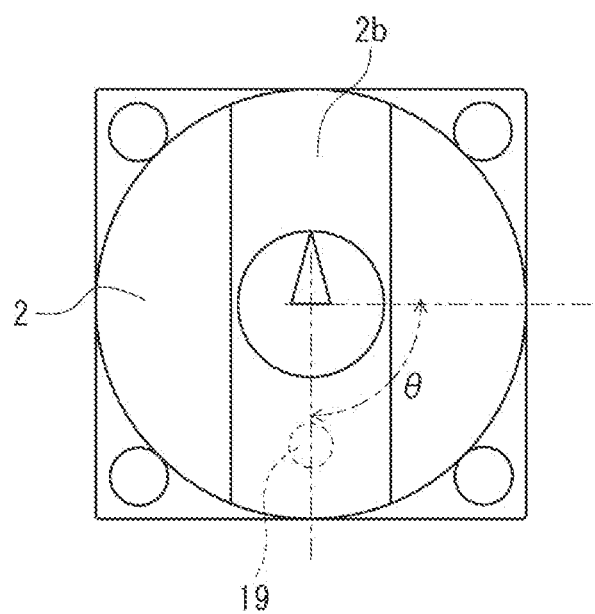

In FIG. 5, the handle 2 is provided so as to be operated to open the valve when rotated leftward (counterclockwise) and be operated to close the valve when rotated rightward (clockwise). When the handle 2 is rotated leftward to cause a full-open state of FIG. 5(a), the pin 19 is positioned at substantially 3 o'clock direction, and the full-open position of the handle 2 is provided so as to be adjustable by the full-open position adjustment mechanism 20 in FIG. 3. On the other hand, when the handle 2 is rotated rightward from the full-open state of FIG. 5(a) to cause a fully-closed state of FIG. 5(b), the pin 19 is positioned at substantially 6 o'clock direction and, with abutment of the pin 19 on the valve-closed-side end face 30a in FIG. 3, further rotation of the handle 2 is inhibited. With these, a rotation angle θ of the handle 2 from the valve-open state of FIG. 5(a) to the valve-closed state of FIG. 5(b) of the handle 2 is set at substantially 90 degrees.

From an end position of the groove portion 30 on the full-open side of FIG. 3 over a side surface 11b of the cap 11, a linear communication hole 31 is formed to communicate. In this communication hole 31, a female screw portion 31a is formed. In this female screw portion 31a, an insert nut (embedded nut) 32 is attached by screw-fastening. In the present embodiment, as this insert nut 32, a sprew is used and, furthermore, a sprew with an enhanced locking effect called a lock type is used. On the inner circumference of this insert nut (sprew) 32, a female screw 33 is provided. This female screw 33 is arranged in part of the communication hole 31.

The above-described full-open position adjustment mechanism 20 includes an adjusting member 35. By this adjusting member 35, the position of the pin 19 in the full-open state can be adjusted. On the adjusting member 35, an abutting portion 36 is formed on which this pin 19 abuts, the abutting portion 36 in a state of being able to advance and retreat to a moving direction of the pin 19.

The adjusting member 35 in the present example is formed of a set screw. This set screw 35 includes a male screw 37 screwable in the female screw 33 of the insert nut 32. With these male screw 37 and the female screw 33, the set screw 35 can freely advance and retreat with respect to the communication hole 31. With this, the set screw can be inserted in any position in the communication hole 31.

An end face of the set screw 35 on a screw-in side serves as the above-described abutting portion 36, and the pin 19 abuts on this abutting portion 36. With this, with the male screw 37 and the female screw 33, the set screw 35 is caused to advance and retreat in the communication hole 31 to adjust the position of the abutting portion 36. By making the pin 19 when the handle 2 is in a full-open state abut on this abutting portion 36, the rotation of the handle 2 is limited. In this manner, the full-open position adjustment mechanism 20 freely limits the rotation of the handle 2 on the valve-opening operation side by adjusting the position of the set screw 35, and the rotation angle θ of this handle 2 and the spindle 13 is set to restrict the degree of opening of the valve disk 12. Thus, an upper limit of the flow rate at the time of full open can be set.

In this case, a formation area of the female screw 33 is set in advance so that the angle of the spindle 13 when the valve disk 12 is fully open (substantially 90 degrees with respect to the valve-closed state) is included in a range of adjustment of the full-open position of the set screw 35. With this, when the full-open position is adjusted, the insertion position of the set screw 35 is adjusted so that the pin 19 abuts on the abutting portion 36 in a state in which the valve disk 12 has not reached to be fully open, thereby allowing adjustment of the upper limit of the flow rate of the valve main body 1.

Furthermore, the formation area of the female screw 33 is desirably provided in a range including 90 degrees, which is the ideal full-open angle of the spindle 13, and angles equal to or smaller than 90 degrees and equal to or larger than 90 degrees, in consideration of the individual difference of the valve main body 1. According to this, when a large difference occurs in the rotation angle θ of the spindle 13 when the valve main body 1 is fully open after assembled, the full-open position can be set accordingly by the full-open position adjustment mechanism 20 to be equal to or larger or smaller than 90 degrees.

Between the female screw 33 and the male scree 37, an adhesive 38 may be applied. In this case, with the adhesive 38, the set screw 35 is fixed in a state of being positioned at the insert nut 32.

The bonnet 15 inside the body 10 is substantially annularly formed having a step portion on the outer circumference, and is fixed as being interposed and attached between the upper body 10a and the lower body 10b. A through hole 15a is formed at the center of the bonnet 15. Into this through hole 15a, a pressurizing member 16 in a substantially columnar shape is inserted so as to be able to ascend and descend. On a bottom surface side of this pressurizing member 16, the valve disk (diaphragm) 12 is mounted in a state in which its outer circumferential side is interposed between the bonnet 15 and the lower body 10b.

Furthermore, between the pressurizing member 16 and the spindle 13, a spindle cap 17 is attached, in a state of being attached to a plurality of disc springs 18, so as to cover a lower side of the spindle 13.

With the inner structure of these, when the handle 2 is rotated to a valve-closing direction, the spindle 13 descends as rotating with respect to the body 10. With this descent of the spindle 13, the pressurizing member 16 is pushed down through the disc springs 18 and the spindle cap 17. By this pressurizing member 16, a portion near the center of the valve disk 12 is pressurized to press-fit to the valve seat 14 to seal the flow path 10c.

On the other hand, when the handle 2 is rotated to a valve-opening direction, the spindle 13 ascends as rotating with respect to the body 10. With this ascent of the spindle 13, the pressurizing force to the valve disk 12 is released. After the contracted disc springs 18 are returned to the original shape, the spindle cap 17 ascends. Together with this, as the pressurizing member 16 ascends, the valve disk 12 is recovered to the shape in an open state, and the flow path 10c becomes in an open state.

Note that while the groove portion 30 is formed on the upper surface of the cap 11 provided to the valve main body 1 in the above-described embodiment, instead of providing the cap 11, it may be configured that the groove portion 30 is provided directly on the upper surface of the body 10.

Also, while the pin 19 is mounted on the bottom surface 2a of the handle and the groove portion 30 in a substantially arc shape is formed on the upper surface IIa side of the cap, the groove portion may be formed on the bottom surface 2a of the handle and the pin 19 may be mounted on an upper surface 11a side of the cap (upper surface side of the valve main body 1) (not depicted). Like these, it is only required that the pin 19 be provided on either the bottom surface 2a of the handle or the upper surface side of the body and this pin 19 be engaged with the groove portion 30 in a substantially arc shape formed on the other side to set part of the rotation area of the handle 2 at the time of opening and closing.

Without insertion of the insert nut 32 into the communication hole 31, the female screw portion 31a formed in the communication hole 31 may be used as a female screw to which the male screw 37 is to be screw-fastened. Furthermore, in any of these cases, application of the adhesive between the male screw and the female screw may be omitted. In this case, by rotating again the set screw 35 after adjustment, the position of the abutting portion 36 can be adjusted and changed. On the other hand, the male screw and the female screw may be fixedly attached by fixedly attaching means other than the adhesive 38.

The open/close angle of the handle 2 from the valve-closed state to the valve-open state may be other than 90 degrees. In this case, this can be addressed by setting the angle at which the groove portion 30 is formed at any angle equal to or larger than 0 degree and equal to or smaller than 360 degrees.

Next, the operation and action of the manually-operated diaphragm valve of the present invention in the above-described embodiment are described.

In the above-described valve main body 1, even if each component configuring this valve main body 1 has an individual difference, after assembled, it is possible to adjust the flow rate with high accuracy by the full-open position adjustment mechanism when the valve disk 12 is fully open. In this case, the adjusting member 35 formed of the set screw of the full-open position adjustment mechanism 20 is caused to advance or retreat with respect to the communication hole 31 via screwing between the male screw 37 and the female screw 33; the position of the abutting portion 36 as a screw-in side end face of this set screw 35 is moved, thereby adjusting the abutting position of the pin 19 abutting on this abutting portion 36; and by limiting the rotation of the handle 2 with the pin 19 mounted thereon on the valve-opening operation side at the time of full open, the flow rate at the time of full open can be freely set.

Specifically, after the valve main body 1 is assembled, in a state in which a fluid is let flow inside this valve main body 1, the insertion position of the set screw 35 is adjusted. When there is a match with a desired flow rate, the adjustment by the advancement or retreat of the set screw 35 is stopped, and that position is set as a full-open position of the valve main body 1.

For example, when the Cv value of a fluid is set at 0.62 at a temperature of 200 degrees Celsius in a full-open state of the handle 2, the set screw 35 is caused to advance or retreat to a position where the Cv value is 0.62 to adjust the abutting portion 36. With this, when the handle 2 is at full open, the pin 19 abuts on the abutting portion 36 and its rotation is restricted, and the valve main body 1 with the Cv value at the time of full open being reliably set at 0.62 can be provided. After the valve main body 1 is assembled, even if the rotation angle θ of the handle 2 and the spindle 13 at the time of full open is varied due to the individual difference, the rotation of the handle on the manual operation side at the time of full open is limited by the full-open position adjustment mechanism 20, thereby exerting a certain Cv value.

With this, when a plurality of valves not depicted are connected in a parallel state on a secondary side of the valve main body 1, without individual adjustment of the flow rate on these secondary-side valves, the fluid with a desired flow rate can be supplied to the secondary-side valves when the valve main body 1 is at full open, and processes subsequent to the secondary-side valves can also be stabilized. Furthermore, by the full-open position adjustment mechanism 20 accurately setting the Cv value of the valve main body 1 at the time of full open, cases are also addressed in which a fluid at a different temperature or with a different fluid pressure is let flow.

To obtain a desired Cv value at the time of full open, it is possible to decrease the full-open position from 90 degrees. For example, to set the Cv value at the time of full open at 0.5, the angle of the handle at the time of full open is adjusted by the full-open position adjustment mechanism at approximately 75 degrees.

As with the valve main body 1 of the present embodiment, when the rotation angle θ of the handle 2 at the time of opening and closing is set in a range of substantially 90 degrees, a quarter-turn type is used as the valve main body 1. Even when opening and closing of the valve disk 12 is controlled at a small rotation angle of the handle 2 as in this case, the Cv value can be set with high accuracy. In the case of the valve main body 1 of a quarter-turn type, the orientation of the knob portion 2b of the handle 2 is visually recognized from outside, thereby also facilitating a check of the open/closed state.

When the rotation angle θ of the handle 2 from the valve-open state to the valve-closed state is provided at any angle from 0 degree to 360 degrees, the flow rate for the quarter-turn type at the time of full open can be set to be small or large. Also in this case, the flow rate at the time of full open can be set with high accuracy.

Since the pin 19 and the set screw 35 are provided in a rotation area of the handle 2 in which the bottom surface 2a of the handle and the upper surface 11a of the cap are opposed, it is not required to allocate an area for arranging the full-open position adjustment mechanism 20 outside the valve main body 1. This prevents an increase in size of the valve main body 1 and also achieves excellent compactness.

Since the insert nut 32 formed of a lock-type sprew is inserted into the communication hole 31 and the inner circumference of this sprew 32 is taken as the female screw 33 in which the male screw 37 is screwed, looseness less tends to happen after the set screw 35 is screwed in this female screw 33 for positional adjustment. Even if a strong vibration or impact is added from outside, looseness of the set screw 35 is reliably prevented. With this, the position of the set screw 35 after adjustment can be firmly retained. Furthermore, by applying the adhesive 38 between the male screw 37 and the female screw 33, the fixing force is further enhanced, and a positional deviation of the set screw 35 is more reliably prevented. On the other hand, with the use of the sprew 32, application of the adhesive 38 can also be omitted. Also in this case, a sufficient retaining force can be exerted to prevent a positional deviation of the set screw after adjustment.

Figure 7:
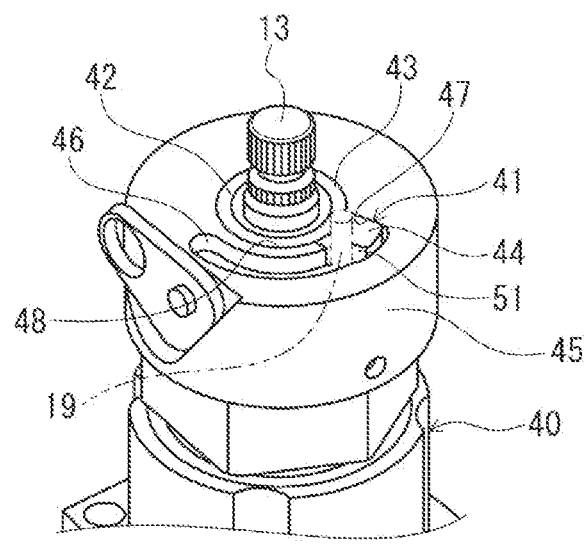
FIG. 7(*a*) is a perspective view depicting a second embodiment of a manually-operated diaphragm valve of the present invention, and FIG. 7(*b*) is a plan view of (a).
Figure 7:
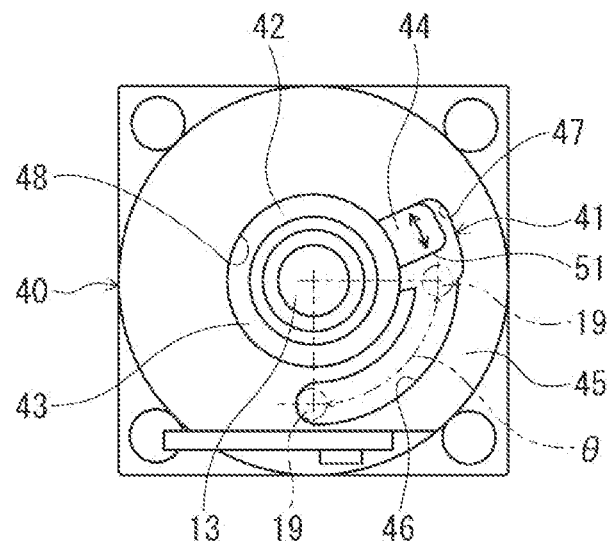

In FIG. 7(a) and FIG. 7(b), a second embodiment of the manually-operated diaphragm valve of the present invention is depicted. Note that in this embodiment, a portion identical to that of the above-described embodiment is represented with the same reference character and its description is omitted.

Figure 9:
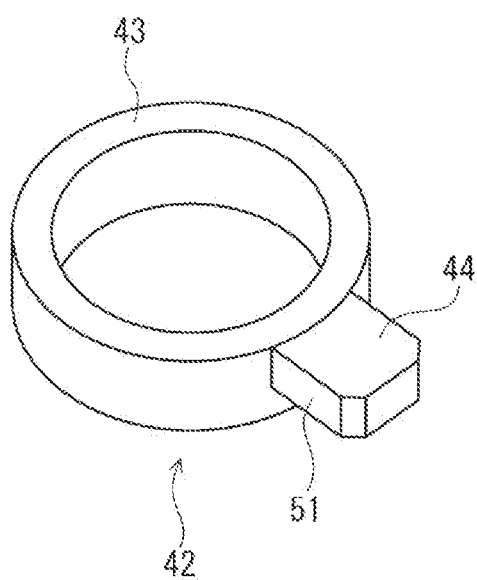
FIG. 9 is a perspective view depicting an adjusting member in FIG. 7.

A valve main body 40 in this embodiment includes a full-open position adjustment mechanism 41, and this full-open position adjustment mechanism 41 includes an adjusting member 42 depicted in FIG. 9. The adjusting member 42 includes a cylindrical portion 43 and a protruding piece 44 formed on an outer circumferential side of this cylindrical portion 43, and is provided to be able to be attached on an upper surface side of the cap 45 of the valve main body 40.

Figure 8:
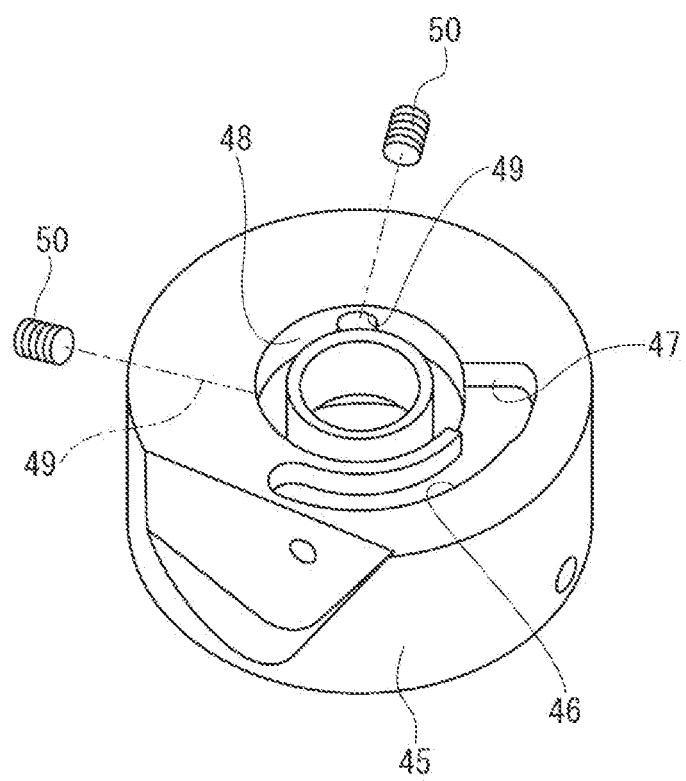
FIG. 8 is a perspective view depicting a cap.

As depicted in FIG. 8, on a cap 45 side, a groove-shaped accommodating portion 47 is formed which spreads, from a groove portion 46 formed in an arc shape substantially similar to that of the above-described embodiment, slightly more than the groove portion 46 so as to extend in a circumferential direction on a valve-opening operation side. On an inner diameter side of the groove portion 46, a circumferential groove 48 is formed which partially communicates with the accommodating portion 47. This circumferential groove 48 is provided to have a size and a depth which allow the cylindrical portion 43 of the adjusting member 42 to be accommodated in a loosely-fitting state. On an outer circumferential side of the cap 45, screw holes 49 are formed at two locations at an angle of substantially 90 degrees so as to communicate with the circumferential groove 48. Into each of these screw holes 49, a set screw member 50 is inserted as being screw-fastened so as to be able to freely advance and retreat.

The adjusting member 42 is accommodated on the upper surface side of the cap in a state in which the cylindrical portion 43 is inserted in a state of being rotatable about its rotation axis into the circumferential groove 48 and the protruding piece 44 is attached in a state of being able to advance and retreat inside the accommodating portion 47. The protruding piece 44 becomes in a state of being opposed to the pin 19 of the handle, and this opposed side of the pin 19 serves as an abutting portion 51.

The adjusting member 42 is provided so as to be able to be fastened with the two set screw members 50. Fixedly attached from these two locations, the cylindrical portion 43 is fixed inside the cap 45 in a state in which a positional deviation is prevented, and the protruding piece 44 is fixed inside the accommodating portion 47.

With the above-described structure, after the valve main body 40 is assembled, the cylindrical portion 43 is rotated inside the circumferential groove 48 to adjust the protruding piece 44 (abutting portion 51) at a desired position inside the accommodating portion 47. By fixing the cylindrical portion 43 with the set screw members 50, it is possible to adjust the abutting portion 51 to a valve full-open position. At the time of full open of the handle, the pin 19 abuts on the abutting portion 51 to restrict the rotation of the handle, thereby allowing the Cv value at the time of full open to be accurately set.

In this valve main body 40, for example, when the Cv value at a fluid temperature of 20 degrees Celsius in a full-open state of the handle is on the order of approximately 0.25, the openable/closable angle of the handle is adjusted by the full-open position adjustment mechanism 41 from 90 degrees to an angle on the order of approximately 70 degrees. Thus, the Cv value can be adjusted to be a value on the order of 0.20.

In the foregoing, while the embodiments of the present invention have been described in detail, the present invention is not limited to the embodiments described above and can be variously changed in a scope not deviating from the spirit of the invention described in the claims of the present invention.

REFERENCE SIGNS LIST 1 valve main body
2 handle 2a bottom surface
10 body
11 cap
11a upper surface
12 diaphragm (valve disk)
13 spindle
14 valve seat
19 pin
20 full-open position adjustment mechanism
30, 46 groove portion
31 communication hole
32 insert nut
33 female screw
35 set screw (adjusting member)
36 screw-in-side end face (abutting portion)
37 male screw
38 adhesive
42 adjusting member
43 cylindrical portion
44 protruding piece
48 circumferential groove
51 abutting portion
θ rotation angle of the handle

The invention claimed is:

1. A manually-operated diaphragm valve, comprising:
a valve main body which includes
   a body,
   a valve disk formed of a diaphragm attached inside the body, and
   a spindle screw-fastened to the body so as to be able to ascend and descend to cause the valve disk to make contact with and go away from a valve seat attached inside the body; and
a handle for manually performing a rotating operation of the spindle, the handle being mounted above the valve main body,
wherein the handle is attached to the valve main body such that a bottom surface of the handle and an upper surface side of the valve main body oppose each other,
wherein a pin provided on the bottom surface of the handle is engaged with a groove portion formed in a substantially arc shape on the upper surface side of the valve main body to set a rotation area of the handle for opening and closing the diaphragm valve,
wherein the groove portion extends from a first inner end to a second outer end, and the valve main body includes a valve-closed side end face provided at the first inner end of the groove portion and an advancement/retreat area which linearly extends from the second outer end of the groove portion,
wherein the valve main body has
   a communication hole which includes the advancement/retreat area and which communicates with the second outer end of the groove portion,
   a first female screw provided on an inner circumferential surface of the communication hole,
   an insert nut having a lock function fastened to the first female screw, a second female screw being provided on an inner circumference of the insert nut, and
   a set screw having an abutting portion at a tip of the set screw, the set screw being inserted into the communication hole from an outer end of the communication hole such that an entirety of the set screw is arranged inside of the communication hole,
wherein the set screw is a male screw which is screw-fastened to the second female screw of the insert nut so as to be fixed to the inner circumference of the communication hole via the insert nut, and
wherein a position of the abutting portion is adjustable by screwing the set screw so as to cause the abutting portion to advance or retreat in a linear manner in the advancement/retreat area inside the communication hole, such that the pin abuts on the valve-closed side end face in a fully-closed position and abuts on the abutting portion in a fully-open position.

2. The manually-operated diaphragm valve according to claim 1, wherein a rotation angle of the handle from a valve-closed state to a valve-open state is any angle larger than 0 degrees and equal to or smaller than 360 degrees.

3. The manually-operated diaphragm valve according to claim 2, wherein the rotation angle is 90 degrees.

* * * * *